(12) United States Patent
Nagy

(10) Patent No.: US 12,514,637 B2
(45) Date of Patent: Jan. 6, 2026

(54) PROCESS FOR RESPIRATORY REHABILITATION TREATMENT

(71) Applicant: Areté Airway Solutions, LLC, Sheffield Village, OH (US)

(72) Inventor: Scott Nagy, Sheffield Village, OH (US)

(73) Assignee: ARETÉ AIRWAY SOLUTIONS, LLC, Sheffield Village, OH (US)

( * ) Notice: Subject to any disclaimer, the term of this patent is extended or adjusted under 35 U.S.C. 154(b) by 0 days.

(21) Appl. No.: 18/608,719

(22) Filed: Mar. 18, 2024

(65) Prior Publication Data
US 2024/0358434 A1    Oct. 31, 2024

Related U.S. Application Data

(60) Provisional application No. 63/498,323, filed on Apr. 26, 2023.

(51) Int. Cl.
| | | |
|---|---|---|
| *A61B 18/22* | (2006.01) | |
| *A61M 37/00* | (2006.01) | |
| *A61B 18/00* | (2006.01) | |

(52) U.S. Cl.
CPC ......... *A61B 18/22* (2013.01); *A61M 37/0015* (2013.01); *A61B 2018/00321* (2013.01); *A61B 2018/00577* (2013.01); *A61M 2037/0023* (2013.01); *A61M 2037/0061* (2013.01); *A61M 2202/0415* (2013.01); *A61M 2202/0439* (2013.01); *A61M 2202/045* (2013.01); *A61M 2202/048* (2013.01); *A61M 2202/09* (2013.01)

(58) Field of Classification Search
CPC .. A61M 2037/0061; A61M 2037/0023; A61M 37/0015; A61B 2018/00321
See application file for complete search history.

(56) References Cited

U.S. PATENT DOCUMENTS

| | | | |
|---|---|---|---|
| 8,921,037 B2 | 12/2014 | Han | |
| 10,034,996 B2 | 7/2018 | Lemper | |
| 10,639,245 B2 | 5/2020 | Mihajlova et al. | |
| 10,772,824 B2 | 9/2020 | Najafi | |
| 2011/0130706 A1* | 6/2011 | Kellogg | A61M 37/0015 604/20 |
| 2012/0065551 A1* | 3/2012 | Aviad | A61B 18/203 606/9 |
| 2017/0028137 A1* | 2/2017 | Mirabito | A61N 1/0502 |
| 2022/0361940 A1* | 11/2022 | Chang | A61B 18/203 |

* cited by examiner

*Primary Examiner* — Deanna K Hall
(74) *Attorney, Agent, or Firm* — Caldwell Intellectual Property Law

(57) ABSTRACT

A process for respiratory rehabilitation treatment, the process comprises treating a patient with a laser, resurfacing the treatment location by applying pulses of laser light. The process comprises treating a patient with administering an injection, injecting a primary injection solution into an injection location and injecting a secondary injection solution comprises at least a concentrate solution into an injection location. This process treats patients with breathing difficulties with injection of PRP and/or PRF into the soft palate and surrounding tissue. The treatment may be combined with CO2 and/or Nd-YAG laser treatment.

20 Claims, 7 Drawing Sheets

PROCESS FOR RESPIRATORY REHABILITATION TREATMENT

CROSS-REFERENCE TO RELATED APPLICATIONS

This application claims the benefit of priority of U.S. Provisional Patent Application Ser. No. 63/498,323, filed on Apr. 26, 2023, and titled "AIRWAY REJUVENATION," which is incorporated by reference herein in its entirety.

FIELD OF THE INVENTION

The present invention generally relates to the field of therapeutics. In particular, the present invention is directed to a process for respiratory rehabilitation treatment.

BACKGROUND

Breathing difficulties, particularly during sleep, are a prevalent concern for many individuals. Such challenges encompass common conditions like snoring and more severe disorders like sleep apnea. The medical field has offered various devices and methods to address these respiratory issues, prominent among which are the CPAP (Continuous Positive Airway Pressure) machines and specific surgical interventions. Although these established devices and methods have been beneficial to a certain extent, there remains a significant demand for more effective, efficient, and user-friendly treatments.

SUMMARY OF THE DISCLOSURE

In an aspect, a process for respiratory rehabilitation treatment, the process include treating a user with a laser, wherein treating comprises injecting a treatment location with a local anesthetic and resurfacing the treatment location by applying pulses of laser light. The process includes administering an injection, wherein administering comprises formulating a primary injection solution, wherein the primary injection solution comprises acquire a biological sample relating to a user, collect the primary injection solution from the biological sample, and inject the primary injection solution into an injection location relating to the user. The primary injection solution further comprises formulating a secondary injection solution, wherein the secondary injection solution comprises at least a concentrate solution. The primary injection solution further comprises administering the primary injection solution and the secondary injection solution.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to processes for respiratory rehabilitation treatment. In an embodiment, the process for respiratory rehabilitation treatment comprises treating a user with a laser.

Aspects of the present disclosure can be used to treat users with sleep disorder according to their needs and response. This is so, at least in part, because the proposed process offers a personalized approach, ensuring that treatments are tailored to the specific physiological and pathological characteristics of each user, thereby maximizing therapeutic efficacy, and minimizing potential side effects.

Aspects of the present disclosure allow for respiratory rehabilitation treatment, allowing for a flexible and adaptive treatment methodologies. Exemplary embodiments illustrating aspects of the present disclosure are described below in the context of several specific examples.

Figure 1:
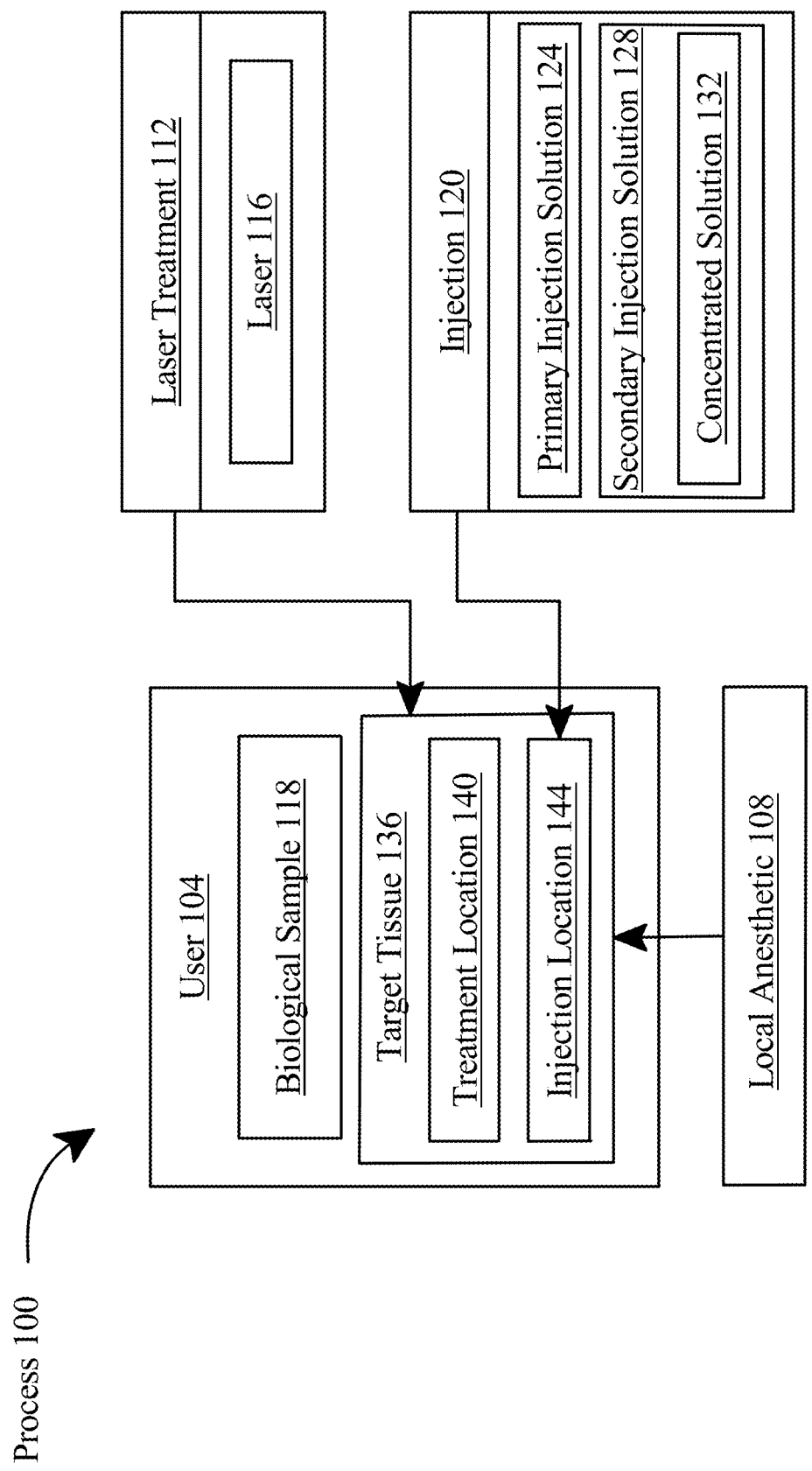
FIG. 1 is a block diagram of an embodiment of an apparatus for respiratory rehabilitation treatment.

Referring now to FIG. 1, an exemplary embodiment of a process 100 for respiratory rehabilitation treatment is illustrated. As used in this disclosure, a "respiratory rehabilitation" refers to the injection treatment process described below in this disclosure. Process 100 may include at least a laser treatment 104, wherein the laser treatment 104 treating with a laser 108. As used in this disclosure, a "treatment" refers to a process that may outline the course of treatment for a specific disease or clinical condition. For example, process 100 may address the treatment for sleep apnea and sleep disordered problems. As used in this disclosure, a "laser treatment" refers to a device that may use laser technology to treat a specific disease or clinical condition. Laser treatment 104 may be configured to contain at least a laser 108. As used in this disclosure, a "laser" is a device that emits light though a process of optical amplification based on the stimulated emission of electromagnetic radiation. As a non-limiting example, laser treatment 104 as described herein may include a QUIETNITE laser therapy (administrated by DEKA). In some cases, laser treatment 104 may be customizable; for instance, laser treatment 104 may be tailored to patient's specific needs. In one embodiment, patient may adjust QUIETNITE protocol based on current user experience and clinical outcomes.

Still referring to FIG. 1, wherein the at least a laser 104 comprises injecting a treatment location 112 with a local anesthetic. As used in this disclosure, a "treatment location" As used in this disclosure, a "treatment location" refers to a specified region or site on an individual's body where therapeutic intervention, including laser procedures, is to be administered. This location is determined based on the underlying condition to be treated, the desired outcome, and the nature of the therapeutic intervention. As used in this disclosure, a "local anesthetic" refers to a substance or agent that induces a reversible loss of sensation or pain in treatment location 112 of user body without causing a loss of consciousness. For example, the local anesthetic may act by blocking nerve conduction in treatment location 112, allowing process 100 to be conducted without causing discomfort or pain to the user. As a non-limiting example, local anesthetic may be, but not limited to substances lidocaine, bupivacaine, prilocaine, or mepivacaine, which are commonly used in various medical and dental procedures to numb a specific area and prevent pain sensations during the intervention.

Still referring to FIG. 1, wherein the at least a laser treatment 104 treating with laser 108 comprises resurfacing treatment location 112 by applying laser 108. In an embodiment, wherein resurfacing treatment location 112 by applying laser 104, laser 104 may be applied by using pulse motion. As used in this disclosure, "pulse motion" refers to a motion. This motion may allow for precise control over process 100 of laser 108, enabling targeted treatment while minimizing damage to surrounding tissues. In another embodiment, wherein laser 104 includes ablation of a target tissue. As used in this disclosure, a "target tissue" refers to a distinct region or site within the body that may be identified and selected for therapeutic intervention. For example, the target tissue may be selected by a medical professional, based on diagnostic findings, the nature of the ailment, and the desired therapeutic outcome. This specific area or tissue requires attention either due to its altered physiological state, presence of pathology, or as a part of a preventive or restorative medical procedure. As a non-limiting example, a user may present with a sleep disorder attributable to nocturnal snoring, laser 108 may be directed towards target tissue located within the user's throat and airway to alleviate the underlying cause. In a further embodiment, wherein the laser 104 include removal of the target tissue and modification of the target tissue at the treatment location. As a non-limiting example, laser 104 may be employed to ablate excess tissue causing obstructions while simultaneously reshaping or altering the remaining tissue to optimize airflow and prevent recurrent obstructions.

Still referring to FIG. 1, In an embodiment, laser 108 may include a carbon dioxide laser. As a non-limiting example, carbon-dioxide laser ($CO_2$ laser) may be employed to address pronounced respiratory patterns or sonorous respiration during slumber. $CO_2$ laser, which may include without limitation a DEKA Laser, may be used to remove or reshape the uvula and a portion of the soft palate. By doing so, the procedure may increase the width of the airway in the region of the oropharynx, reducing the potential for obstruction and, thus, the likely hood of snoring. In another embodiment, laser 108 may include a neodymium-doped yttrium aluminum garnet laser (Nd: YAG laser). As used in this disclosure, a "neodymium-doped yttrium aluminum garnet laser" refers to a deeper penetration into the tissue compares to the $CO_2$ laser. For example, the Nd: YAG laser has a longer wavelength compared to the $CO_2$ laser, this allows for deeper penetration into the soft palate tissue, which may be useful in coagulating vessels and reducing bleeding.

Still referring to FIG. 1, in an embodiment, a scope may be used with an incorporated laser during the process for respiratory rehabilitation treatment. As used in this disclosure, a "scope" refers to an optical instrument, such as a microscope or camera, designed to magnify or provide a detailed view of specific regions, particularly those not easily visible to the naked eye. This includes, but is not limited to, devices tailored to monitor or inspect intricate areas within the human anatomy, such as the soft palate in the throat. As a non-limiting example, a scope may be specifically designed to give a close-up visualization of the human soft palate, assisting in precision during the treatment. It should be noted that the dimensions and specifications of the scope can vary based on its intended application and design considerations. In another embodiment, the scope, may resemble fiber optic scopes commonly used in otolaryngology (ENT), head and neck surgery procedures, scope may have a laser either incorporated into its design or added as an auxiliary component to enhance visualization and treatment precision, especially in areas that are challenging to access or require pinpoint accuracy. To combat potential issues of glare or reflections caused by the laser during procedures, the scope may also be equipped with a specialized filter. This filter may be designed to attenuate the specific frequency of the laser, ensuring that some of the reflected light is diminished, thus providing the operator with a clearer view during treatment.

Still referring to FIG. 1, in a further embodiment, the scope not only aids in visual magnification but also provides enhanced visual guidance for precise targeting. Scope may encompass advanced features such as real-time area identification, overlaying treatment guidelines, or highlighting specific tissue regions that require intervention. As a non-limiting example, a patient may require precise laser treatment on a specific region within the soft palate to address a respiratory issue. Utilizing a scope with advanced visual guidance capabilities ensures that the laser is administered directly to the intended target, avoiding surrounding tissues. This precise targeting not only maximizes the efficacy of the treatment—ensuring optimal outcomes for the patient—but also minimizes potential side effects such as damage to adjacent tissues or undue discomfort post-procedure. Furthermore, to enhance and support these advanced visual guidance functionalities, one or more computing devices may be integrated with or connected to the scope system. Computing devices may process real-time imaging data, run specialized software algorithms to identify target regions, and even provide feedback to the practitioner. For example, algorithms may automatically detect tissue irregularities or other anomalies that might indicate specific treatment needs. As a non-limiting example, a medical procedure where a practitioner is tasked with treating a small, difficult-to-reach lesion within the throat using a laser. By integrating a computing device with the scope, the system may process real-time imaging data and overlay precise guidelines onto the visual feed, indicating the exact location and dimensions of the lesion. This automated guidance aids the practitioner in targeting the laser accurately, even in cases where visual distinction might be challenging. The computing device's assistance not only bolsters the precision of the treatment but also minimizes the chances of missing the lesion or inadvertently treating adjacent healthy tissue.

Still referring to FIG. 1, in a further embodiment, the process may incorporate advanced intensity measurement capabilities, ensuring that the appropriate energy, whether measured in lumens, joules, or another relevant metric, is delivered to the targeted tissue. Such functionality not only enables the practitioner to monitor the exact energy levels being administered but also safeguards against potential over-treatment. An integrated sensor mechanism within the laser process may detect when the target energy delivery has been reached and may automatically halt or adjust the laser's operation to prevent excess energy application. As a non-limiting example, user may require laser treatment for a delicate area within the throat, where both the target tissue and surrounding tissues are particularly sensitive. During the procedure, the laser device is set to deliver a precise dosage of energy to achieve the desired therapeutic effect without harming the nearby tissues. As the treatment progresses, the integrated sensors of the laser device continually monitor the amount of energy being delivered. Once the set energy threshold is reached, the device's automated control system intervenes and ceases the laser emission, ensuring that the exact dosage is administered. Moreover, advanced sensors and feedback mechanisms may also be equipped to detect any change in the position or orientation of the laser during the procedure. If an unintentional shift or movement occurs, for example, due to patient movement or other factors, the system can automatically recalibrate, resetting the target energy delivery parameters for the newly positioned area of tissue. As a non-limiting example, user may undergo laser treatment for a skin condition. During the process, the patient slightly shifts, causing the laser's focus to move to an adjacent, untargeted area. The change in position is promptly detected by the sensor, feedback mechanisms may automatically recalibrate, adjusting its energy parameters for this new tissue region. The system ensures that the newly targeted area receives the appropriate energy level without overexposure to provide consistent treatment across different areas but also significantly reduces the risk of inadvertent damage to the surrounding tissue.

Still referring to FIG. 1, process 100 may include administering an injection 116. As used in this disclosure, an "injection" refers to an act of introducing a substance into a user, using a pressure or a specialized device. For example, a substance may be referring to a liquid, such as medications or vaccine. A "pressure or a specialized device" may be referring to the use of a syringe and needle. As a non-limiting example, the substance may be injected into different layers of the body like the muscle (intramuscular), under the skin (subcutaneous), or directly into the bloodstream (intravenous). Injection 116 may formulate a primary injection solution 120, wherein the primary injection solution may include acquire a biological sample 124 related to a user. As used in this disclosure, a "primary injection solution" refers to a compound of the biological sample acquired from user. As used in this disclosure, a "biological sample" refers to a specimen or material taken from a user. In an embodiment, wherein acquiring the biological sample may include acquiring blood samples. Blood samples may be extracted from individuals to assess potential diseases, infections, blood cell levels, and various other medical evaluations. Biological samples 124 includes, but not limited to blood, urine, saliva, tissue, DNA, and the like, used in this disclosure, a "user" refers to any individual, including but not limited to patients, who may be subjected to or benefit from the described procedures, interventions, or evaluations. Users may encompass a broad range of individuals and is not limited strictly to those receiving medical care. In another embodiment, wherein collecting the primary injection solution comprises centrifugation. As used in this disclosure, "centrifugation" refer to a procedure or technique wherein a mixture is subjected to rotation at high speed, facilitating the separation of its components based on their densities. Exemplary embodiments of centrifugation may include, without limitation, PRF and general PRP protocols as described in further detail below. In a further embodiment, wherein the primary injection solution comprises a buffy coat. As used in this disclosure, a "buffy coat" refers to the white layer of blood cells and platelets. In a non-limiting example, buffy coat may be obtained from a human blood sample following centrifugation, where it typically appears as a distinct layer between the plasma and the red blood cells.

Still referring to FIG. 1, in an additional embodiment, the present disclosure contemplates the use of specialized storage mediums and conditions for preservation. As a non-limiting example, to ensure the viability of stem cell over extended periods, undifferentiated cells may be stored in storage medium. As used in this disclosure, "storage medium" refers to a xeno-free and feeder-free medium specially formulated for the growth and expansion of human pluripotent stem cells. For example, StemFlex™ Medium and Essential 8™ Medium may be used to preserve live cells. Such storage considerations are particularly essential when dealing with undifferentiated stem cells, given their potential for differentiation and therapeutic applications. The storage medium may contain a balanced mixture of nutrients, growth factors, and preservatives that may maintain the cells' vitality, prevent unwanted differentiation, and reduce the risk of contamination. These cells may be stored at specific temperatures, often at cryogenic levels, to further enhance their preservation. Additionally, before administration to a patient, the cells might be brought to a different temperature more suitable for integration within the human body without causing shock or injury to the surrounding tissues. In another example, platelet-rich fibrin (PRF) matrix may also be employed as a natural storage medium for growth factors, cells, and cytokines. As a non-limiting example, an undifferentiated stem cells, extracted for therapeutic purposes, might be stored in a cryopreservation solution containing dimethyl sulfoxide (DMSO) and other cryoprotective agents. These cells could then be kept at temperatures as low as $-196°$ C., commonly achieved using liquid nitrogen storage systems. Such low temperatures slow down metabolic and biochemical processes, effectively halting the cells in time and preserving their undifferentiated state. When the time comes for these stem cells to be used in treatment, they may be thawed to room temperature and subsequently warmed to a physiological temperature, ensuring their vitality is maintained while prepping them for effective integration once administered to a patient. In some embodiments, cells may be cultivated or modified according to PRF and general systems of processing PRP as described herein. As a non-limiting example, process 100 may include mixing PRF with other solutions or materials e.g., culture media, scaffolds, and/or the like to enhance cellular activities. One or more assays, such as without limitation, MTT, XTT, live/dead staining, and/or any method or procedures that measure metabolic activity or cell membrane integrity may be used to measure cell proliferation rates.

Still referring to FIG. 1, wherein primary injection solution 120 includes injecting primary injection solution into an injection location 128 relating to the user. As used in this disclosure, a "injection location" refers to a site or region on an organism's body, where a substance may be introduced using a syringe or another delivery mechanism. In an embodiment, wherein the injection location 136 may include injection in the soft palate. As used in this disclosure, the "soft palate" refers to a moveable fold of soft tissue that sits at the back of the mouth, behind the hard palate. Soft palate is made up of muscle fibers and connective tissue covered by a mucous membrane. In another embodiment, wherein the primary injection solution includes undifferentiated cells. "Undifferentiated cells" refers to cells that have not yet developed into a specific cell type. The use of undifferentiated cells have the potential to develop into many different cell types. This may make them important for both natural development and artificial interventions like regenerative medicine. It should be noted that there is no additives, external solutions, or agents (e.g., anticoagulants, thrombin, calcium chloride) are added to PRF preparation process when formulating primary injection solution 120; therefore, at least in part, minimizing adverse reactions such as, without limitations, undesired physiological responses or body reactions, irritation, and/or any other negative side effects by preserving natural composition of PRF.

Still referring to FIG. 1, in a further embodiment, wherein the primary injection solution comprises growth cells. As used in this disclosure, "growth cell" refers to cells that are able to proliferate, the increase in cell numbers that occurs through repeated cell division. In one embodiment, formulating primary injection solution 120 may include an initial blood collection utilizing an aseptic technique to minimize contamination and maintain the integrity of the collected blood samples. In some cases, blood samples may be immediately processed to prevent coagulation and to maintain the physiological pH levels. In some cases, centrifugation speed and time may be optimized to separate the blood components without causing significant cellular damage or altering the blood's pH level. Although direct pH adjustment may not typically be part of PRF protocol as described herein, maintaining a sterile and contamination-free environment may help preserve blood's natural pH level. As a non-limiting example, physiological pH level may be maintained around 7.35 to 7.45 (and temperature around 37° C.) for optimal functionality of cells and proteins within the PRF. In some cases, PRF may be derived from the blood sample without any external adjustments such as adding buffering agents to regulate pH level. Process 100 may further include monitoring the treatment site for signs of inflammation or infection which can alter local pH and affect cell viability.

Still referring to FIG. 1, in another embodiment, wherein injection solution may include white blood cells, "white blood cells" is also called leukocytes, are part of the immune system and help protect the body from infection. In some embodiments, injection solution may include platelet-rich plasma (PRP), PRP may contain an array of autologous growth factors including platelet-derived growth factor (PDGF), transforming growth factor beta (TGF-beta), vascular endothelial growth factor (VEGF) among others, responsible for the migration and/or proliferation of various cell types. In some embodiments, injection solution may include platelet rich fibrin (PRF), may be capable of stimulating tissue regeneration. PRF is a fibrin matrix that contains platelet cells, growth factors, and also cytokines. As a non-limiting example, primary injection solution 120 may be formulated based on PRF after centrifugation in which the PRF clot is extracted from the tube. In some cases, extracted PRF clot may be used as is, liquefied, or mixed with other biocompatible solutions as described above to improve its applicability or efficacy.

With continued reference to FIG. 1, wherein administering injection 116 further comprises formulating a secondary injection solution 132. In an embodiment, wherein the secondary injection solution 132 comprises at least a concentrate solution 136. As used in this disclosure, a "secondary injection solution" refers to concentrated platelet solutions obtained from biological sample 124. In an embodiment, wherein the secondary injection solution comprises Platelet Rich Plasma. "Platelet Rich Plasma (PRP)" is a treatment that uses injections of user's own platelets to speed up the healing of injured tissues. In another embodiment, the secondary injection solution comprises Platelet Rich Fibrin. As used in this disclosure, "Platelet Rich Fibrin (PRF)" is a fibrin matrix that contains platelet cytokines, growth factors, and cells. For example, PRF may be used as a resorbable membrane. In a further embodiment, wherein the injection the second biological sample data comprises at least a syringe. As described in this disclosure, a "syringe" refers to a medical instrument or device used for drawing and dispensing fluids with precision. The syringe may include a cylindrical barrel, a plunger, and a hollow needle. The barrel may hold the fluid, and by pushing or pulling the plunger, the fluid can be expelled through the needle, allowing controlled and measured administration. As a non-limiting example, syringe may serve as a means to accurately inject substances, such as PRP or PRP. In another embodiment, micro-needling, traditionally employed to stimulate collagen production in the skin, may be cautiously adapted to treat the soft palate, potentially enhancing its receptivity to platelet concentrates. As used in this disclosure, "micro-needling" refers to a technique that involves the use of small, sterilized needles to create tiny puncture wounds in injection location. As a non-limiting example, micro-needling may stimulate the body's natural healing response, resulting in increased collagen production and improved skin texture. By applying this technique to the soft palate, it is possible to enhance the absorption and effectiveness of platelet concentrates in the surrounding tissues. Part of laser therapy may also involve targeting specific muscles of the tongue and the area around it. By tightening up the tissue, it may reduce snoring, as it helps the tongue relax back into place. In a further embodiment, wherein the micro-needling comprises controlled injecting velocity.

Still referring to FIG. 1, in some embodiments, a treatment protocol may include the injection of Platelet Rich Plasma (PRP) and/or Platelet Rich Fibrin (PRF) into the soft palate and surrounding tissues. PRF may be the preferred treatment for most users. In some embodiments, surrounding tissues may include but are not limited to sub cutaneous, intramuscular, and subdermal. Injections may invoke neo-collagenesis and fibroblast activation among other typical body functions of natural healing and repair. In a non-limiting example, process 100 for respiratory rehabilitation treatment may be used a minimum of one or up to three initial treatment cycles, spaced at about 21-27 days intervals, followed by possible subsequent maintenance treatments at intervals determined by the user's needs and response. In some embodiments, needles may range from approximately 22 to approximately 31 gauge. The volume of the injections may range from 0.01 to 0.25 cc/ml. Furthermore, determination of the number of injection sites may be personalized, varying from patient to patient. There may be injections only or injections followed by micro-needling treatments of the soft palate and surrounding tissues. In other embodiments, injection 116 described above may be combined with non-surgical laser treatment 104. Laser treatment 104 may use CO2 (carbon dioxide) lasers and/or Nd-YAG (neodymium-doped yttrium aluminum garnet) lasers. CO2 and Nd-YAG laser treatments may be applied to the muscles shown in FIG. 2 and are known to help with breathing difficulties.

Still referring to FIG. 1, in a further embodiment, injection 116 may be applied in numerous ways as determined by the user's needs and response. These protocols include, but are not limited to, any of the following: PRP/PRF injections only, PRP/PRF injections plus Nd-YAG laser protocol similar to NiteLase® (Fotona), PRP/PRF injections plus CO2 laser protocol similar to QuietNite (DEKA), PRP/PRF injections in multiple configurations of position, spacing and amount injected, single or multiple injection sessions, single or multiple laser sessions, single or multiple combination laser and injection sessions, interval of subsequent treatment sessions from initial treatment. Initial treatments were administered to a number of users, and the outcomes have been highly favorable.

Figure 2:
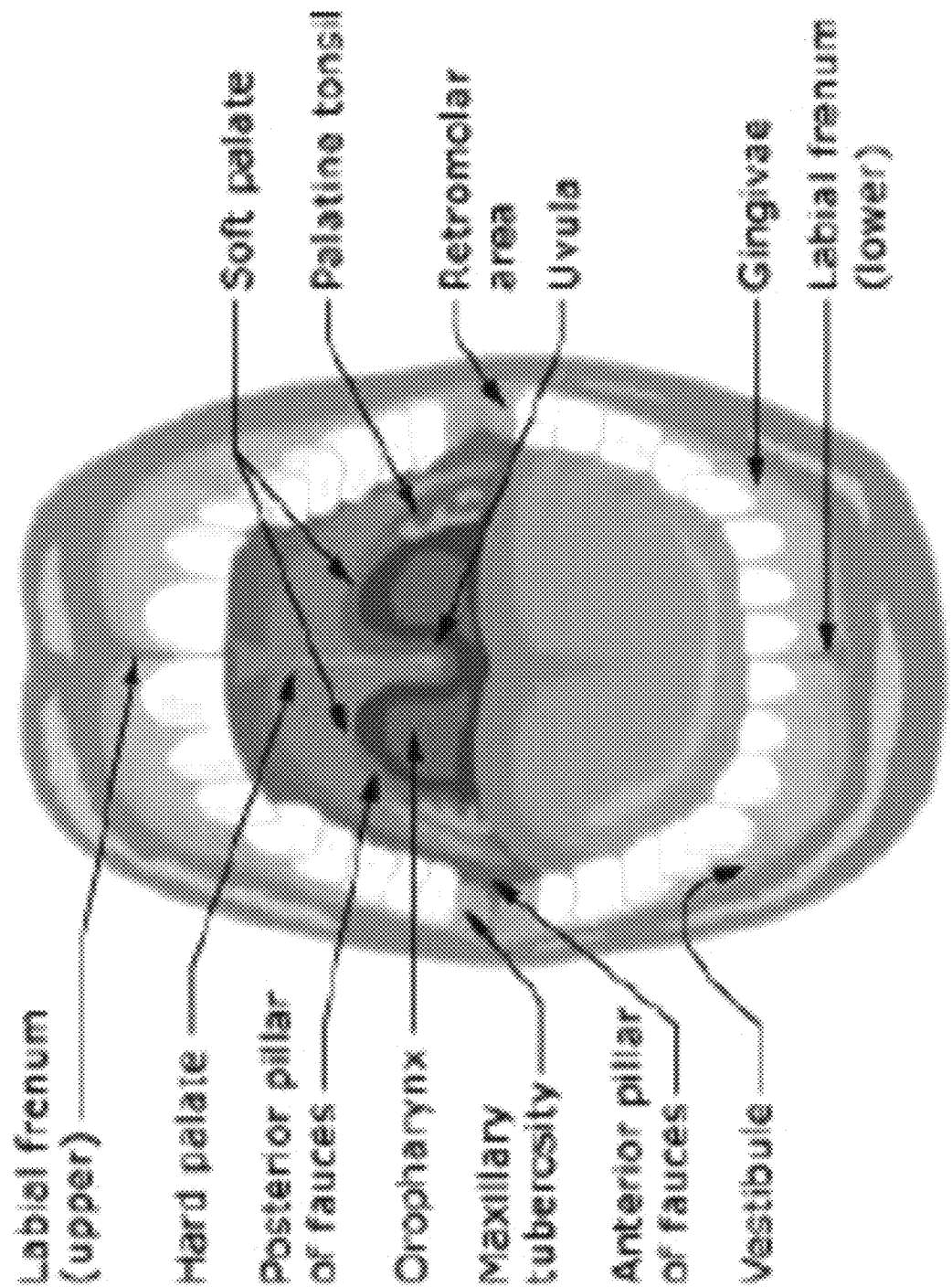
FIG. 2 is an exemplary embodiment of a front view of an open human mouth.

Referring now to FIG. 2, the open human mouth presents a myriad of intricate anatomical structures. The upper labial frenum, a small fold of mucous membrane, connects the center of the upper lip to the gum just above the two central upper incisors. Above it lies the hard palate, the bony anterior section of the mouth's roof, which separates the oral cavity from the nasal cavity. Deeper within, the posterior pillar of fauces or the palatopharyngeal arch stands as a downward tissue fold, marking the lateral boundary of the tonsils and connecting the soft palate to the side of the pharynx. This is closely associated with the oropharynx, the central portion of the pharynx, facilitating the passage of food and air. Adjacent to it is the maxillary tuberosity, a rounded prominence located behind the upper jaw's last molar. In contrast, the anterior pillar of fauces, also known as the palatoglossal arch, runs downward from the soft palate to the tongue's side, demarcating the tonsils' front boundary. The vestibule, the entrance space to the oral cavity, lies between the inner cheeks, lips, and teeth. Below it, the lower labial frenum connects the center of the lower lip to the gum. Surrounding the teeth base are the gingivae or gums, providing protection against bacteria and trauma. The uvula hangs from the soft palate's center, assisting in speech and preventing food from entering the nasal passages. Behind the third molar lies the retromolar area, a triangular space. On either side of the oropharynx are the palatine tonsils, soft tissue masses integral to the immune system. Lastly, the soft palate, the muscular posterior section of the mouth's roof, plays a crucial role in swallowing and speech.

Figure 3:
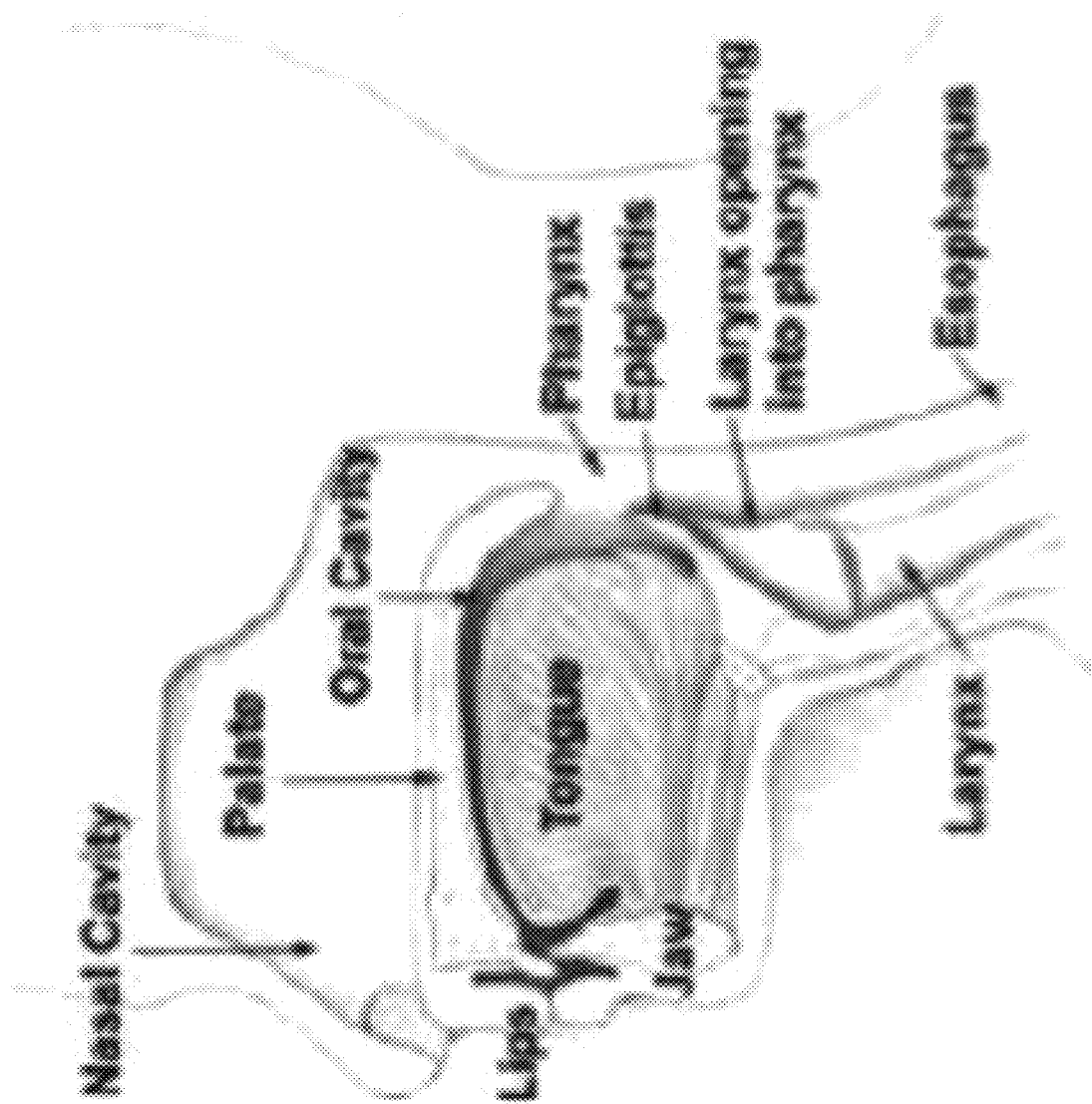
FIG. 3 is an exemplary embodiment of a side sectional view of a human head and neck.

Referring now to FIG. 3, an exemplary embodiment of the side sectional view of a human head and neck unveils the intricate interior anatomical structures. The nasal cavity positioned above the oral region serves as the main airway for breathing and houses our sense of smell. Encasing the mouth's opening are the lips. Beneath these lies the jaw, the bony structure that holds the teeth and facilitates chewing. Central to oral activities is the tongue, a muscular organ crucial for taste, swallowing, and articulating words. Spanning the roof of the mouth is the palate, a barrier separating the oral and nasal cavities, further differentiated into hard and soft sections. Enclosed by the cheeks, palate, tongue, and lips is the oral cavity, the mouth's main chamber where digestion initiates. Deeper within the neck, the pharynx is a funnel-shaped passage connecting the nasal and oral cavities to the esophagus and larynx. Guarding the entrance to the larynx, the epiglottis is a flap-like structure that prevents food and liquids from entering the windpipe during swallowing. The larynx opening into the pharynx ensures air passage to the lungs while blocking the entry of food and drinks. Directly below the pharynx is the larynx, or the voice box, responsible for sound production. Finally, the esophagus, a muscular tube, descends from the pharynx, transporting swallowed substances to the stomach.

Figure 4:
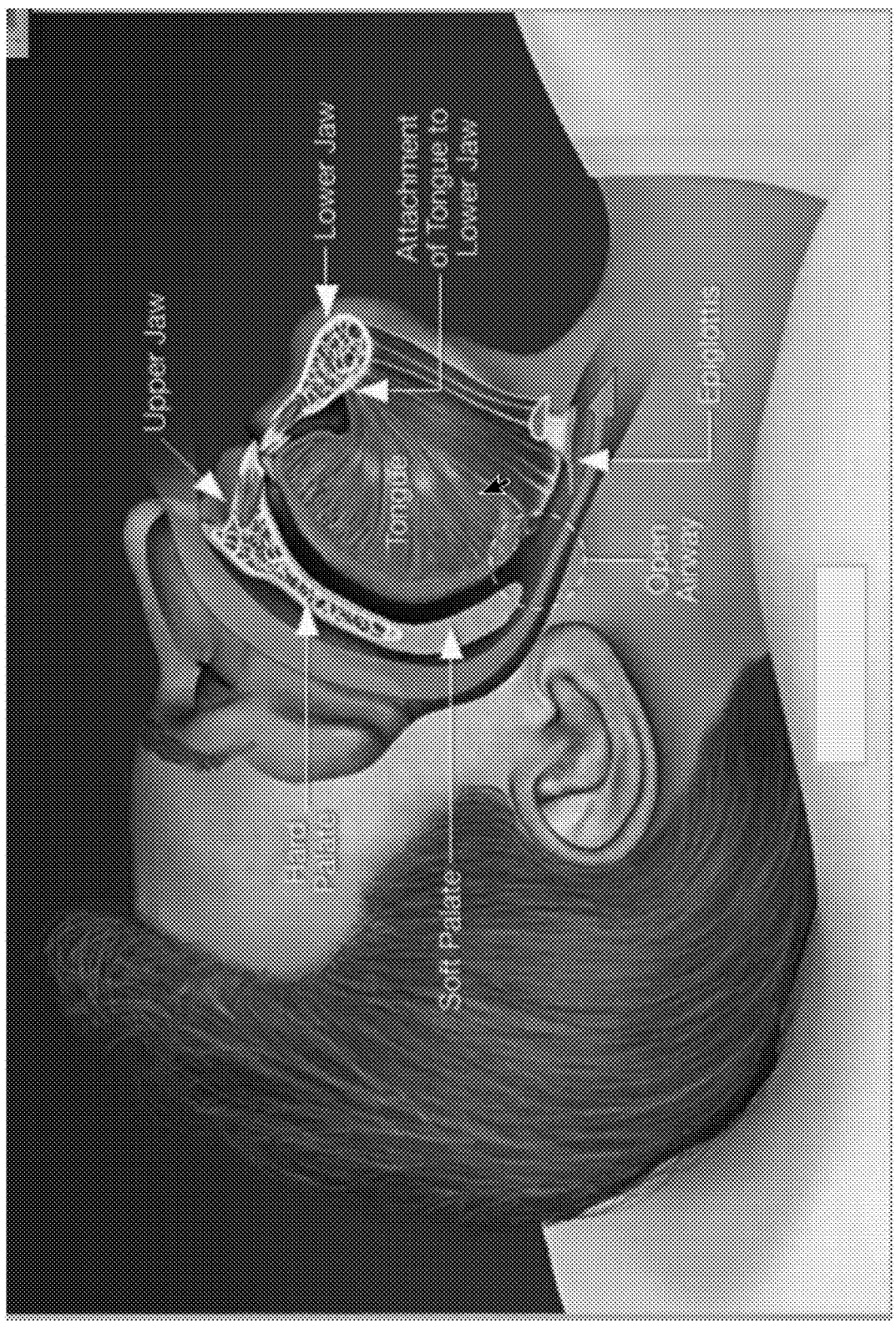
FIG. 4 is an exemplary embodiment of a side sectional view of a human head showing an open airway.

Referring now to FIG. 4, an exemplary embodiment of a side sectional view of a human head showing an open airway. The upper jaw, or the maxilla, forms the main skeletal structure of the upper mouth, opposing the lower jaw, or mandible, which not only provides the structure for the lower mouth but also serves as the moving component in the jaw's articulation. Anchored to the lower jaw is the attachment of the tongue, a muscular entity essential for various oral functions including taste, speech, and swallowing. The tongue's fleshy expanse, strategically situated in the oral cavity, which shaping the airway. Above the tongue rests the hard palate, a rigid, bony platform that constitutes the anterior portion of the roof of the mouth. Transitioning posteriorly from the hard palate is the soft palate, a flexible, muscular flap that has a pivotal role in both eating and breathing; notably, its positioning and movement can significantly influence the patency of the airway. Highlighted in the depiction is the open airway, the vital channel allowing for unobstructed passage of air to and from the lungs. Lastly, ensuring safe consumption and respiration, the epiglottis stands guard at the entrance of the larynx, preventing food and liquid from straying into the respiratory tract during swallowing.

Figure 5:
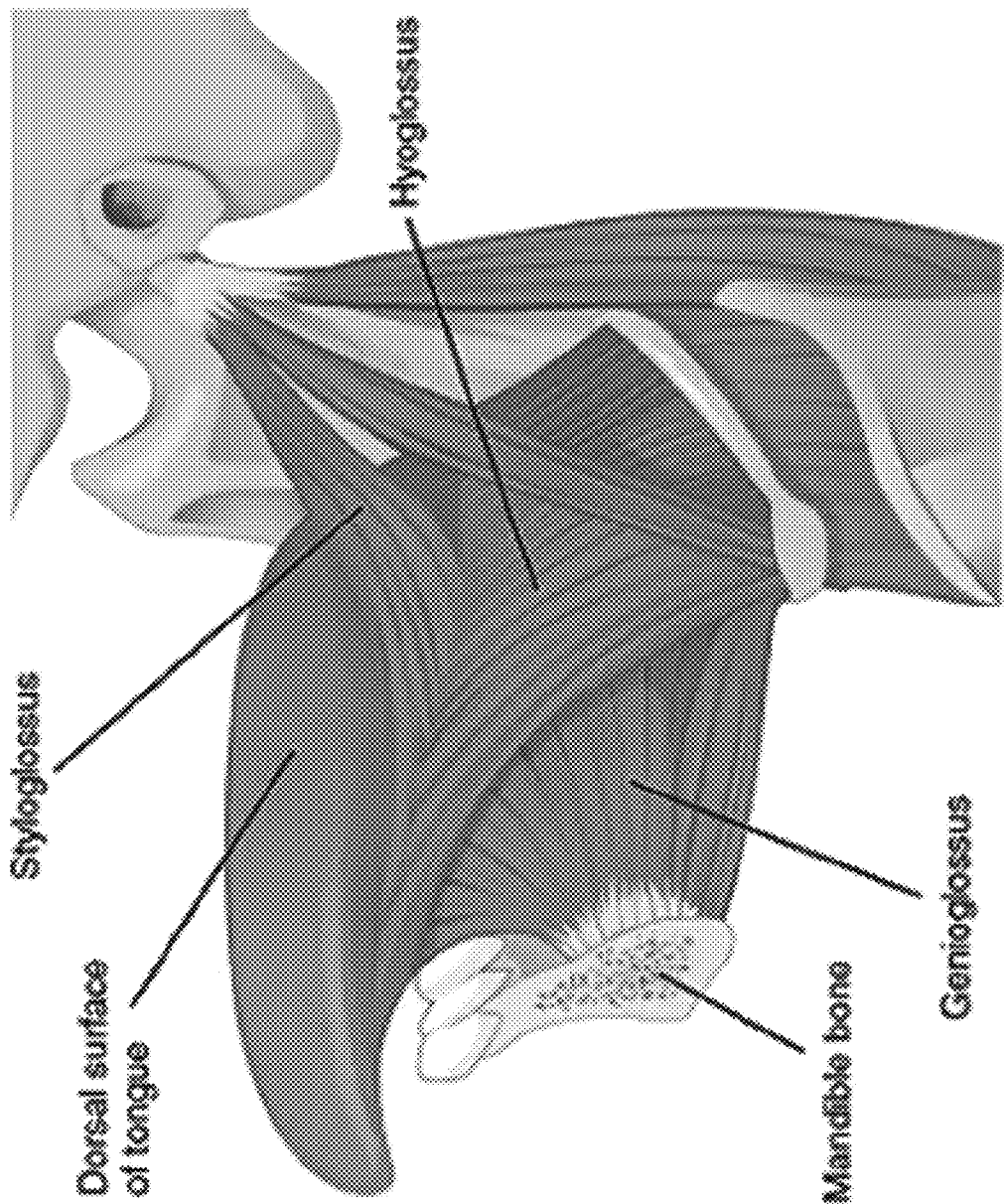
FIG. 5 is an illustration showing and identifying the common muscles of the human tongue.

Referring now to FIG. 5, an illustration showing and identifying the common muscles of the human tongue. The styloglossus muscle, originating from the styloid process of the temporal bone retracts and elevates the tongue. Opposite in action, the hyoglossus muscle, anchored to the hyoid bone, acts primarily to depress the tongue, pulling it downward. Spread across the top of the tongue, the dorsal surface provides a textured landscape integral for taste, tactile sensation, and speech articulation. Providing structural support and boundary for the tongue's base, the mandible bone, or lower jaw, is a pivotal component of the oral anatomy, crucial for speech and mastication. Positioned anteriorly and playing a crucial role in tongue protrusion and depression, the genioglossus muscle emerges from the inside front part of the mandible and spans throughout the length of the tongue.

Figure 6:
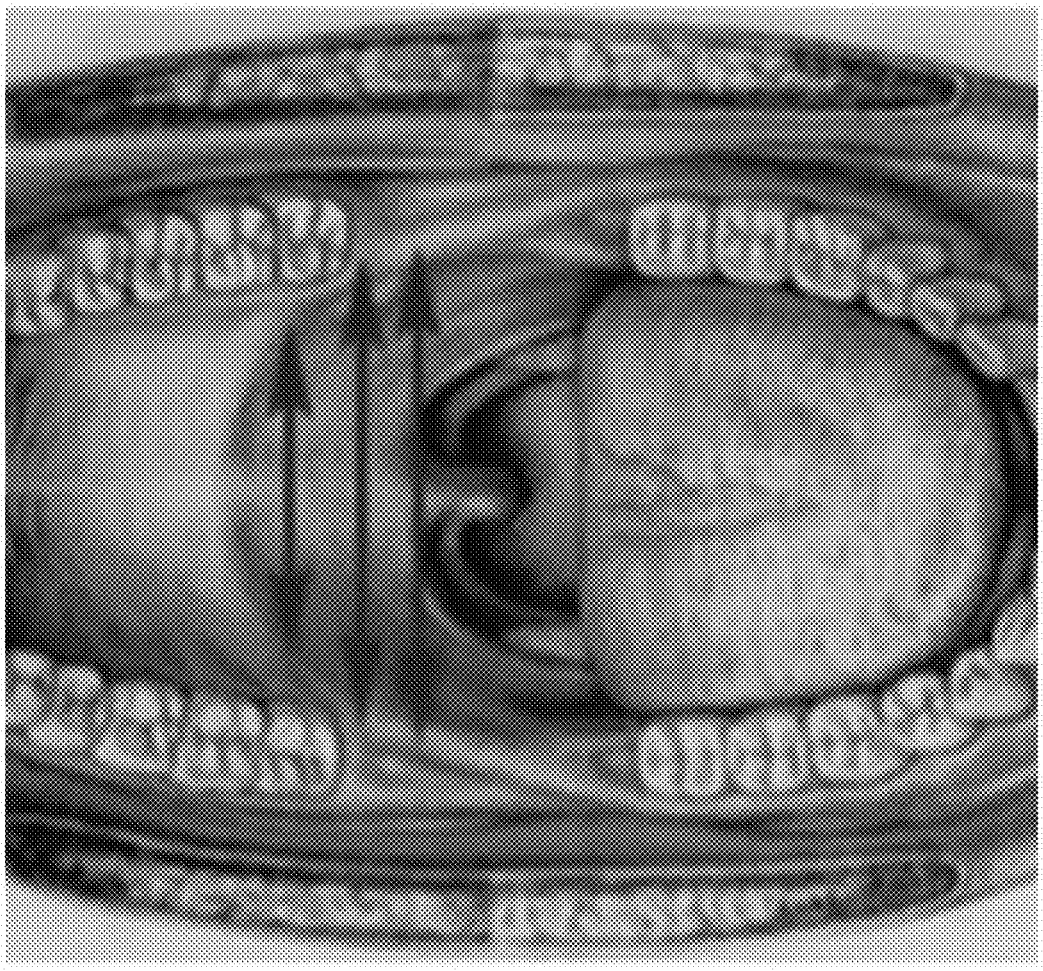
FIG. 6 is an exemplary embodiment of a front view of an open human mouth showing the primary tissue to be treated with injections.

Referring now to FIG. 6, an exemplary embodiment of a front view of an open human mouth showing the primary tissue to be treated with injections.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
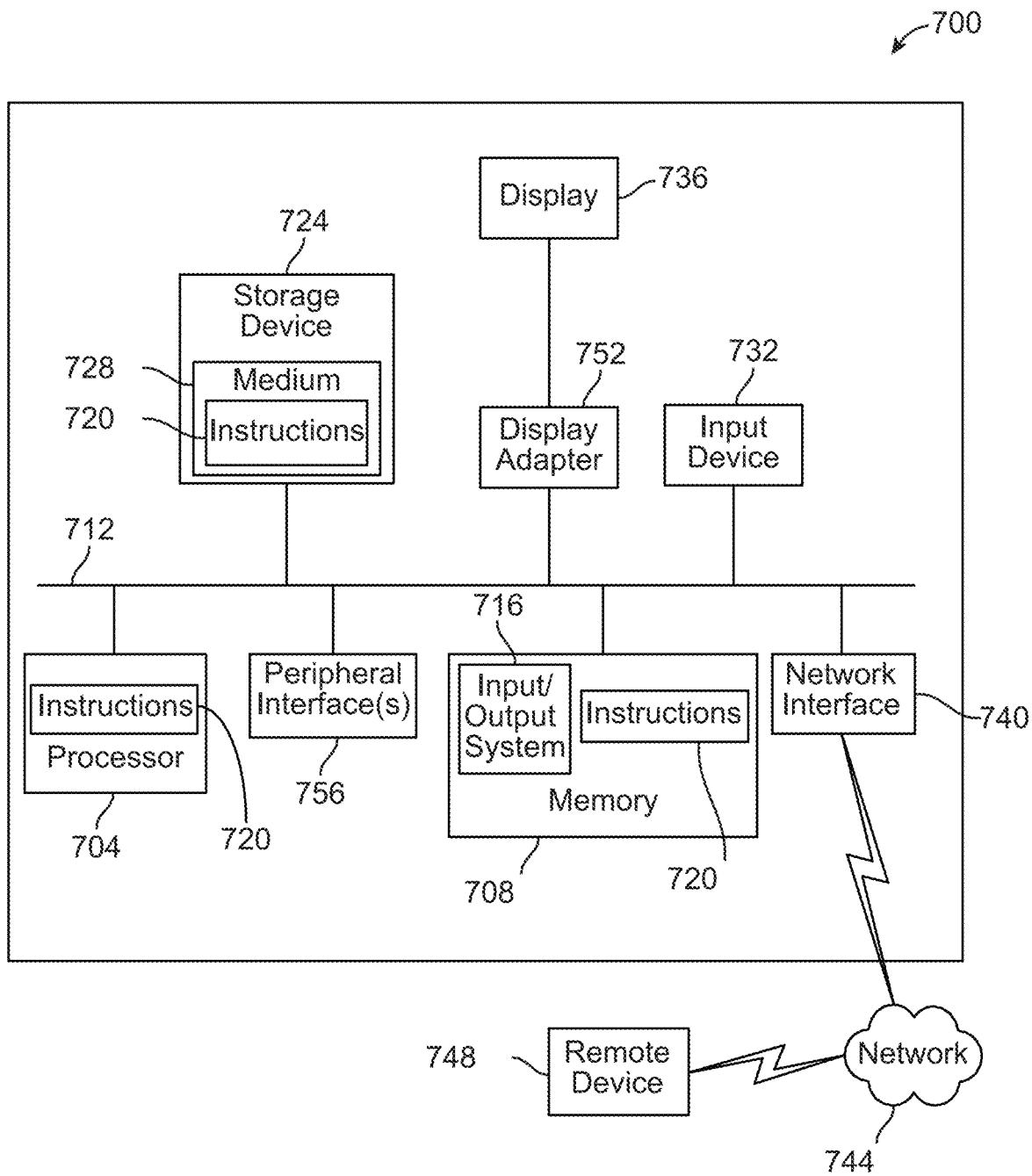
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A process for respiratory rehabilitation treatment, the process comprising:
   treating a user with a laser, wherein the laser comprises a scope, wherein the scope comprises a filter configured to attenuate a frequency of the laser, wherein the scope is configured to produce a real-time visual feed, wherein the scope is further configured to perform real-time area identification, wherein the real-time area identification comprises:
      processing real-time visual feed from the scope;
      identifying target regions using the real-time visual feed; and
      providing feedback, wherein the feedback comprises overlaying guidelines onto the real-time visual feed indicating a treatment location;
   wherein the laser comprises an integrated sensor mechanism configured to adjust an operation of the laser as a function of a detected target energy delivery, wherein treating comprises:
      injecting the treatment location with a local anesthetic; and
      resurfacing the treatment location by applying pulses of laser light;
   administering an injection, wherein administering comprises:
      formulating a primary injection solution, wherein formulating the primary injection solution comprises:
         acquiring a biological sample relating to a user; and
         collecting the primary injection solution from the biological sample;
      injecting the primary injection solution into an injection location relating to the user;
      formulating a secondary injection solution, wherein the secondary injection solution comprises at least a concentrate solution; and
      administering the secondary injection solution.

2. The process of claim 1, wherein the laser comprises a carbon dioxide laser.

3. The process of claim 1, wherein the laser comprises a neodymium-doped yttrium aluminum garnet laser.

4. The process of claim 1, wherein resurfacing the treatment location comprises:
   ablation of a target tissue;
   removal of the target tissue; and
   modification of the target tissue at the treatment location.

5. The process of claim 1, wherein acquiring the biological sample comprises drawing blood sample.

6. The process of claim 1, wherein collecting the primary injection solution comprises centrifugation.

7. The process of claim 1, wherein the primary injection solution comprises extracting a buffy coat.

8. The process of claim 7, wherein extracting the buffy coat comprises:
   removing of concentrated leukocyte band, plasma, and concentrated red blood cells;
   removing the buffy coat from the biological sample.

9. The process of claim 1, wherein the injection location comprises injection in a soft palate.

10. The process of claim 1, wherein the primary injection solution comprises undifferentiated cells.

11. The process of claim 1, wherein the primary injection solution comprises growth cells.

12. The process of claim 1, wherein the primary injection solution comprises white blood cells.

13. The process of claim 1, wherein administering the secondary injection solution comprises using a syringe.

14. The process of claim 13, wherein the secondary injection solution comprises Platelet Rich Plasma.

15. The process of claim 13, wherein the secondary injection solution comprises Platelet Rich Fibrin.

16. The process of claim 1, wherein injecting the primary injection solution comprises a micro-needling to the treatment location.

17. The process of claim 16, wherein the micro-needling comprises controlled injecting velocity.

18. The process of claim 1, wherein the process comprises treating a user with a laser and an injection.

19. The process of claim 1, wherein the process comprises treating a user with a laser and a primary injection solution.

20. The process of claim 1, wherein the process comprises treating a user with a laser and a secondary injection solution.

* * * * *